United States Patent
Besslein

[19]

[11] Patent Number: 6,156,992
[45] Date of Patent: Dec. 5, 2000

[54] WELDING DEVICE CONTROL METHOD AND WELDING DEVICE

[76] Inventor: Wulf Besslein, Lonsstrasse 19, D 93128 Regensauf, Germany

[21] Appl. No.: 09/091,831

[22] PCT Filed: Oct. 18, 1996

[86] PCT No.: PCT/DE96/01988

§ 371 Date: May 4, 1999

§ 102(e) Date: May 4, 1999

[87] PCT Pub. No.: WO97/15415

PCT Pub. Date: May 1, 1997

[30] Foreign Application Priority Data

Oct. 20, 1995 [GB] United Kingdom .............. 195 39 194

[51] Int. Cl.[7] ..................................... B23K 11/25
[52] U.S. Cl. ....................... 219/109; 219/117.1
[58] Field of Search .................... 219/110, 108, 219/109, 86.51, 117.1

[56] References Cited

U.S. PATENT DOCUMENTS

| | | | |
|---|---|---|---|
| 4,628,175 | 12/1986 | Nissl | 219/110 |
| 4,959,519 | 9/1990 | Exner et al. | 219/110 |
| 5,360,958 | 11/1994 | Bogue et al. | 219/110 |
| 5,406,045 | 4/1995 | Kiriishi et al. | 219/110 |
| 5,434,382 | 7/1995 | Schlattl et al. | 219/109 |

FOREIGN PATENT DOCUMENTS 2702691  2/1994  France.

*Primary Examiner*—Clifford C. Shaw
*Attorney, Agent, or Firm*—Hoffman, Wasson & Gitler, PC

[57] ABSTRACT

The invention concerns a welding device control method and a novel welding device for the electrical spot or resistance welding of material to be welded. The welding device comprises at least two weld electrodes which, for the welding process, are pressed by an actuating device at a predetermined electrode force against the material to be welded. The welding device further comprises a control system which controls the welding current via a controller.

8 Claims, 5 Drawing Sheets they are mere to the welding current for the entire service life of the electrodes.

WELDING DEVICE CONTROL METHOD AND WELDING DEVICE

BACKGROUND OF THE INVENTION

The invention relates to a process for controlling a welding device and to a welding means.

In electrical spot and resistance welding it is often difficult to maintain the required quality scale for the welding spots.

It has been shown that the quality, especially the load capacity of a finished welding spot, depends on a plurality of factors, among others, on the electrode force, i.e. on the force with which the electrodes lie pressed against the material to be welded during the welding process, on the size of the welding current, and also on the state of the electrodes or pole caps. The latter, during welding, are subject to heavy wear and change of their surfaces, for example, in the form of a flattening due to wear, but also metallurgically, by the material of the electrodes or pole caps changing on the surface, as is the case in welding of galvanized sheets with copper electrodes. This leads to changes in the thermal and electrical properties of the electrodes or pole caps, conventionally used to execute a plurality of welding spots in time succession.

The object of the invention is to devise a process and welding means ensuring flawless welding spots, in spite of inevitable changes which occur mechanically, metallurgically, etc. on the electrodes or their surfaces by use and hereinafter are generally called "ageing".

SUMMARY OF THE INVENTION

In the invention, the welding current is controlled such that there is at least one testing phase between two successive working phases executing a given number of welding spots. Proceeding from the current intensity used in the working phase preceding the testing phase for the welding current, the welding current is increased in steps and, in doing so, at least one welding spot is executed until the spatter limit is reached. Then, in the new working phase following the testing phase, execution of the welding spots occurs with a welding current reduced by a value, compared to the maximum welding current of the preceding testing phase. This current drop is either determined empirically or by the fact that an adhesive limit must be reached. In each working phase the set value of the welding current is preferably kept constant.

Control sets an outermost maximum value for the welding current which cannot be exceeded under any conditions. In the testing phase, if the spatter limit is not reached for this absolute maximum value for the welding current, replacement of the electrodes is necessary. In the process, this is preferably displayed to the operator on a display.

In a typical embodiment of the process, the gradual increase of the welding current in each welding phase takes place in steps of 0.2 kA. At the end of each testing phase, the size of the welding current drops by roughly 0.4 kA. It is assumed that the distance between the spatter limit and the cement limit is roughly 1 kA. The number of welding spots executed in each working phase is, for example, 50.

In the process, specific feeling the way to the spatter limit is done and then, when the spatter limit is detected using a sensor is reached, the welding current is reduced by a value which is a fraction of the distance between the spatter limit and the cement limit. The pole caps or electrodes are selected and the basic value for the electrode force is set for new electrodes, i.e., electrodes which have not yet been flattened. In this way, welding spots with the required diameter are achieved. Ageing yields flattening of the electrodes and thus an enlargement of the possible welding spot. Optimum welding spots are ensured with consideration of this finding and the previously described control of the welding current for the entire service life of the electrodes.

BRIEF DESCRIPTION OF THE DRAWINGS

The invention is detailed below using the figures.

DETAILED DESCRIPTION OF THE INVENTION

Figure 1:
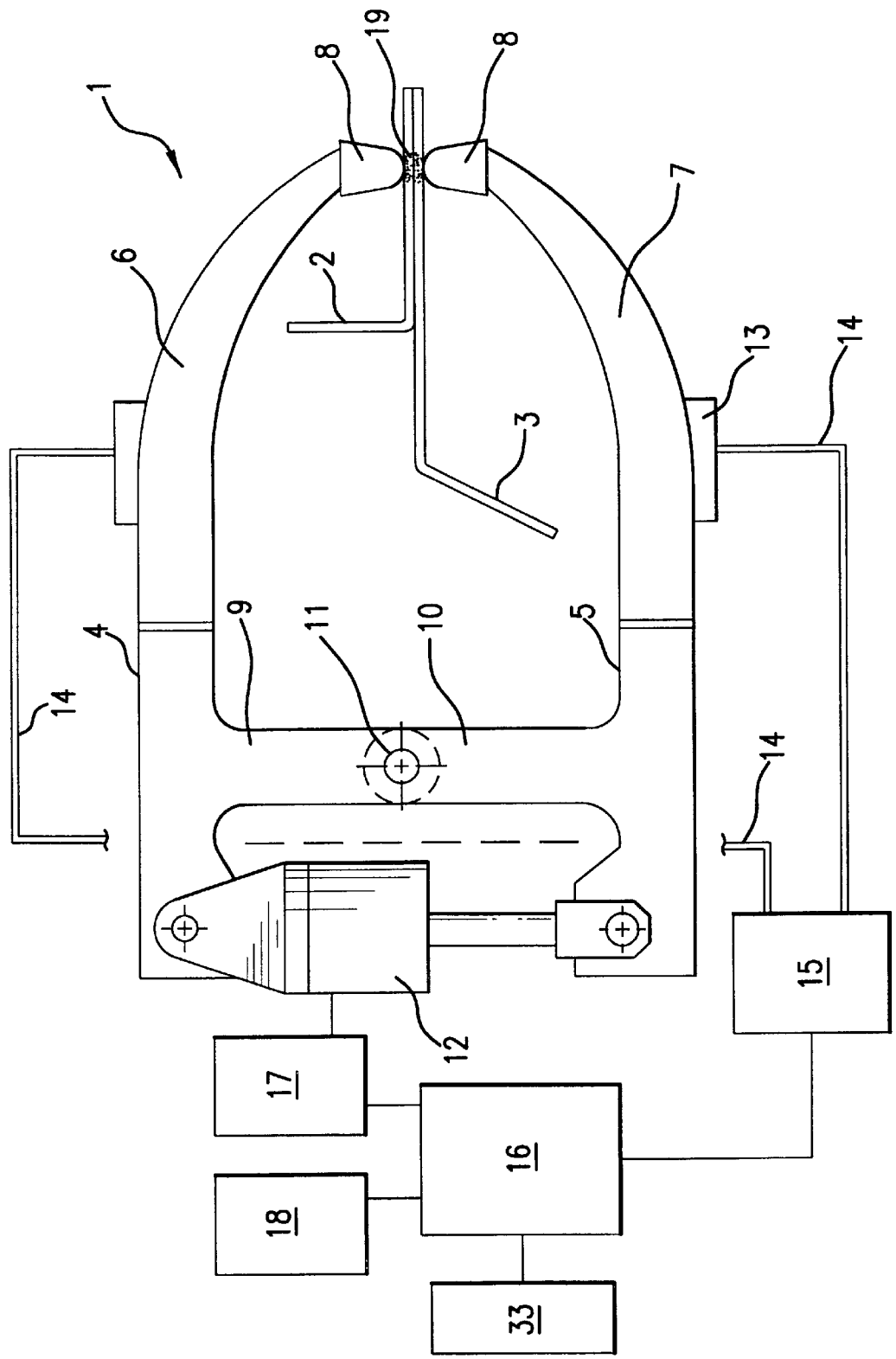
FIG. 1 shows, in a simplified schematic, a welding system which has spot welding tongs invention.

In the figures, welding tongs 1 are for spot and resistance welding of two sheets 2, 3. The welding tongs consist of two pintle holders 4 and 5 to which one end of a pintle 6 and 7 is attached. Its other end forms a welding electrode or is provided with pole cap 8. Pintle holders 4, 5 are each provided with one arm 9 or 10 which is a component of the pintle holder. Arms 9 and 10 are articulated to one another via joint 11 so that pintle holders 4 and 5, and with them pintles 6 and 7 or their pole caps 8, can be swivelled towards and away from one another for opening and closing of the welding tongs 1.

To open and close the welding tongs 1, actuation means 12, formed by at least one cylinder, for example by a pneumatic cylinder, are used and act between prolongations of pintle holders 4 and 5. On each pintle 6, 7 there is a sensor 13 which delivers a measurement signal. When the welding tongs are closed, the measurement signal is dependent on the elastic bending of pertinent pintles 6 and 7 and thus on electrode force F with which the pertinent electrode or pole cap are pressed against the material being welded (sheets 2 and 3) by actuating means 12. Sensor 13 is preferably an optical sensor joined via fiber optic arrangement 14 having several optical fibers to an optoelectric unit. The unit is a component of measurement means 15 which delivers a control signal dependent on the electrode force at the output. Each sensor 13 forms a light segment with a transmission factor dependent on the electrode force, i.e. via fiber optic arrangement 14 to each light section a stipulated amount of light is delivered. The amount of light returned via fiber optic arrangement 14 is a function of the bending of pertinent pintles 6 and 7. With these optical sensors 13 the electrode force and its changes can be very accurately determined during the actual welding process, i.e. during flow of the welding current.

A control means 16, based on the measurement signal delivered from measurement means 15 via control valve means 17, controls actuation means 12 and current controller 18. The time and amplitude of the welding current can be controlled.

It has been found that the quality, i.e. the form, size, and thus the load capacity of welding spot 19, is dependent on various factors, such as the amplitude of welding current I, electrode force F, and on the wear or aging of pole caps 8. This affects the contact area of the pole caps 8 with the material to be welded during the welding process. Channel 19 forms the welding spot where the material to be welded is liquified during the welding process, i.e. for the duration of the welding current.

To achieve optimum quality, i.e. optimum size, shape and load capacity for as large a number of welding spots as possible provided in time succession on the material to be welded or on sheets 2 and 3, as is the case in the production of motor vehicle bodies, in addition to monitoring electrode force F, optimum adjustment of welding current I is necessary. This welding current must be controlled such that so-called "cements" in which, as a result of overly low welding current I, sheets 2 and 3 are joined to one another only superficially, without desired melt channel 19 being formed in and between sheets 2 and 3.

Also so-called spatters based on an overly high welding current I and/or based on an insufficient electrode force on the surface of pole caps 8 being too large due to wear are prevented. Worn pole caps are no longer able to withstand the pressure of the material liquefied by the welding current in channel 19 and the liquefied material sprays away in larger amounts from the respective welding spot. An amplitude is desired for welding current I such that, with the welding current on, channel 19 of the liquid material forms between pole caps 8, and the liquefied material remains essentially in the channel closed by pole caps 8. A certain increase of electrode force occurs during the welding current by thermal volume enlargement of the material to be welded in channel 19. After turning off the welding current and with pole caps 8 pressed against the material to be welded, a gentle decrease of the electrode force occurs due to cooling of the material.

Pole caps 8 are chosen such that a welding spot of the desired size or diameter is achieved with these pole caps in the new state in any case with an optimum welding current. If, during longer use of pole caps 8, the effective surface of these pole caps increases, optimum welding spots can be achieved by increasing welding current I. They then have a somewhat larger cross section; however this is unimportant since these welding spots satisfy the requirements for minimum strength.

Figure 2:
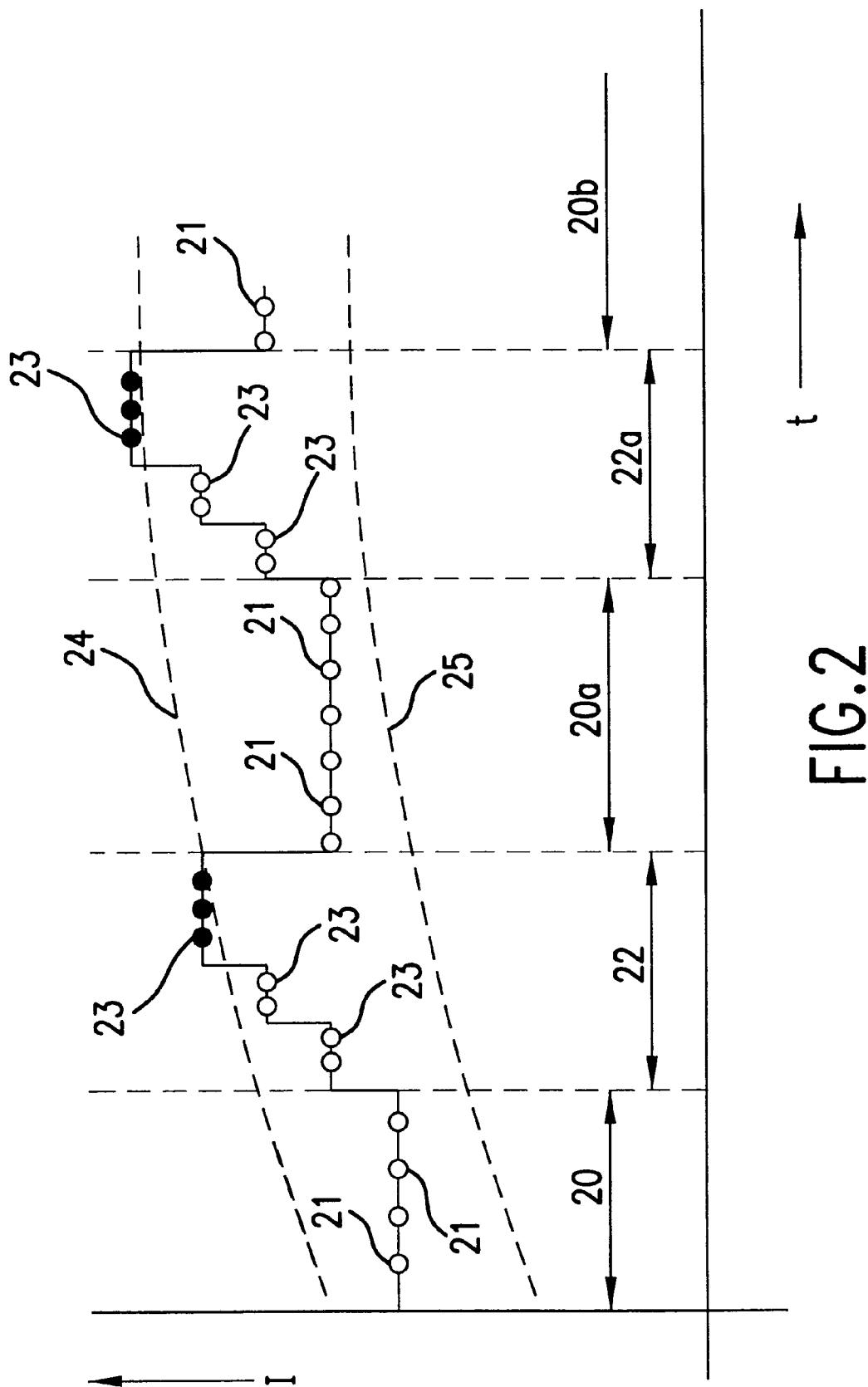
FIG. 2 shows, in a graphic representation, the change in the welding current in the welding current control process.

In FIGS. 2, control of welding current I by means of controller 18 is shown. One working phase is labeled 20 and a series of welding spots 21 are made with welding current I with the same current intensity. After each working phase 20, control means 16 automatically forces testing and control phase 22. The current intensity of welding current I is increased in several stages, for example in stages of 0.6 KA. In each stage at least one welding spot 23, preferably several such welding spots, are executed. The increase of welding current in stipulated increments during testing phase 22 takes place up to a current intensity leading to the aforementioned spatter during welding with consideration of the state of pole caps 8. If this state is reached and recorded by control means 16, this automatically ends testing phase 22 and causes a drop of the current intensity of welding current I by a stipulated fixed amount ΔI. With this set current intensity I, a series of welding spots 21 is produced in new working phase 20*a*. The current intensity in working phase 20*a* is less by an amount ΔI than the maximum current intensity during testing phase 22, but higher than the current intensity in preceding working phase 20. Based on empirical determinations, the current drop ΔI is chosen such that the current intensity is above the so-called cement limit during each working phase 20, 20*a* and also in working phase 20*b* which follows another test phase 22*a* with consideration of the state of pole caps 8.

In FIG. 2 broken line 24 labels the spatter limit and broken line 25 labels the cement limit. Both lines 24 and 25 rise with wear or flattening of pole caps 8.

Control means 16, preferably a computer-supported control means, monitors the proper closing of welding tongs 1 not only based on the signal behavior of the measurement signals delivered by sensors 13, the presence of required electrode force F, but also determines from this signal behavior whether spatter limit 24 is reached during a testing phase. Furthermore, control means 16 is also able to determine from the signal behavior the presence of a proper welding spot and that cement limit 25 has not been reached, by considering or evaluating the differing signal curves typical of these states. This evaluation takes place by comparison of the delivered signal curves with ideal or theoretical curves or by acquiring the changes in the signal behavior that is typical of the respective state (optimum welding spot, exceeding the spatter limit, not reaching the cement limit).

Figure 3:
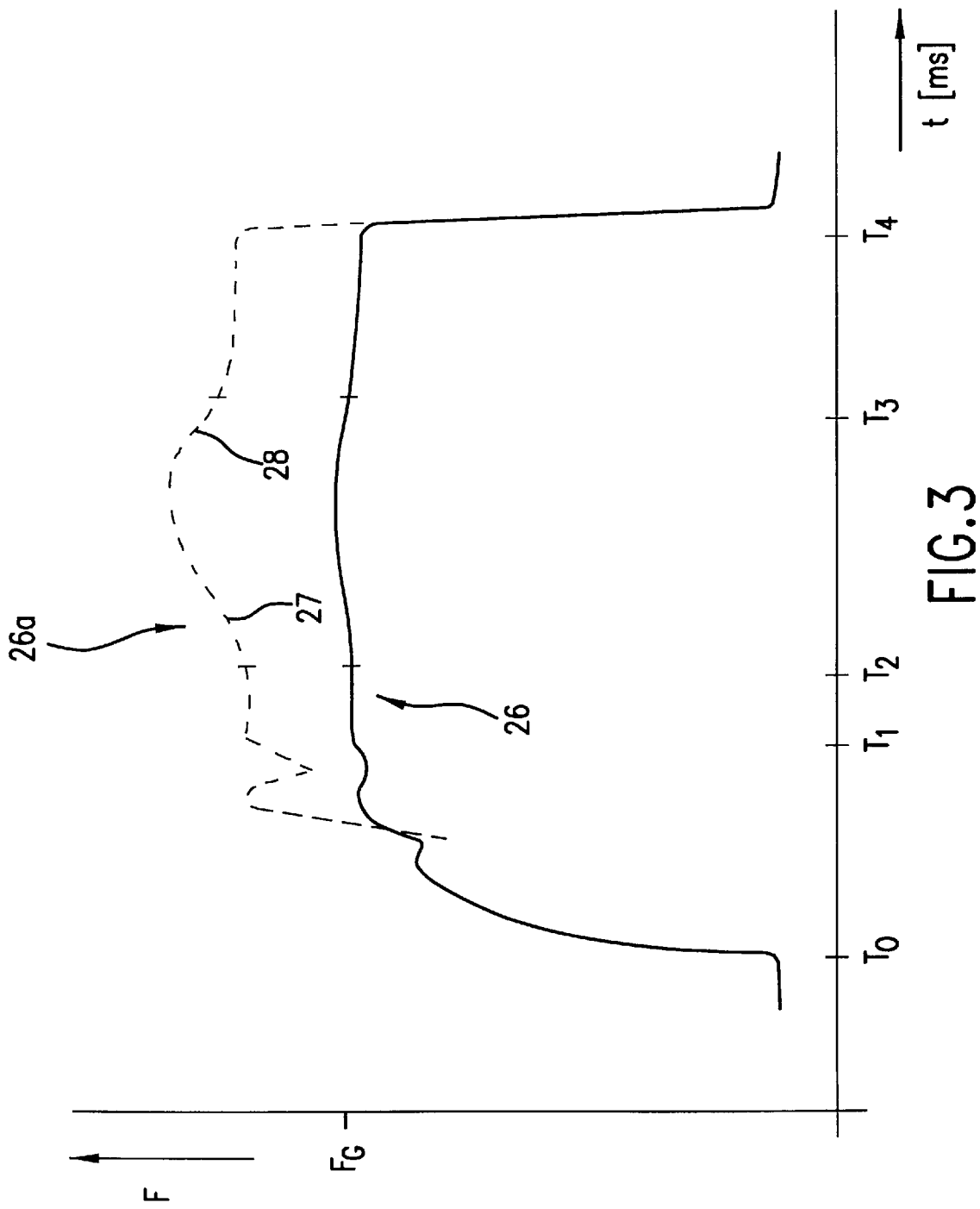
FIGS. 3–5, in a graphic representation, show the time behavior of the electrode force measured on the welding tongs during one welding spot, for an optimum welding spot (FIG. 3), in a welding spot which has not occurred due to overly low welding current (FIG. 4) and for a spatter which has occurred due to overly high welding current and/or overly low electrode force (FIG. 5).
Figure 4:
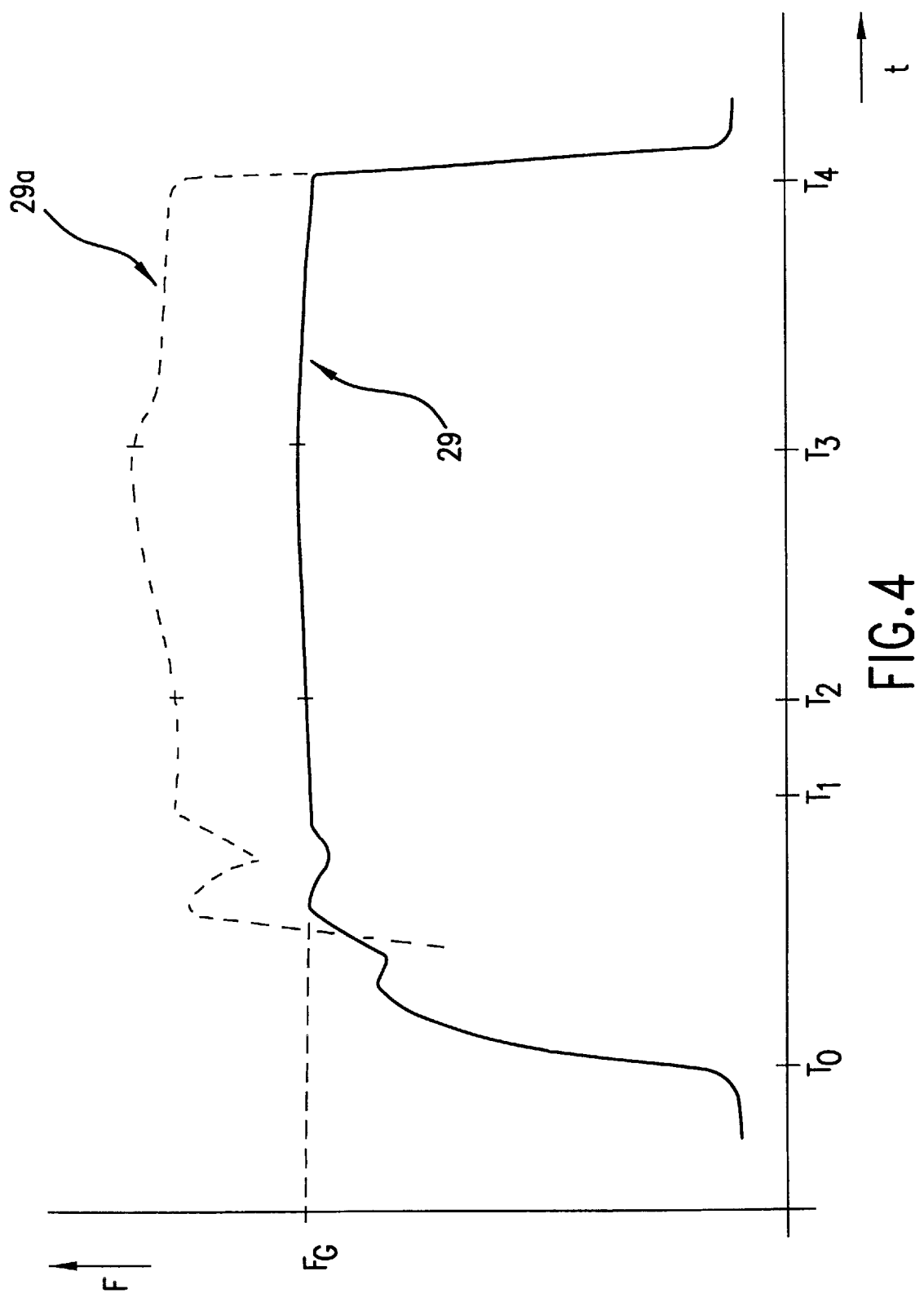
Figure 5:
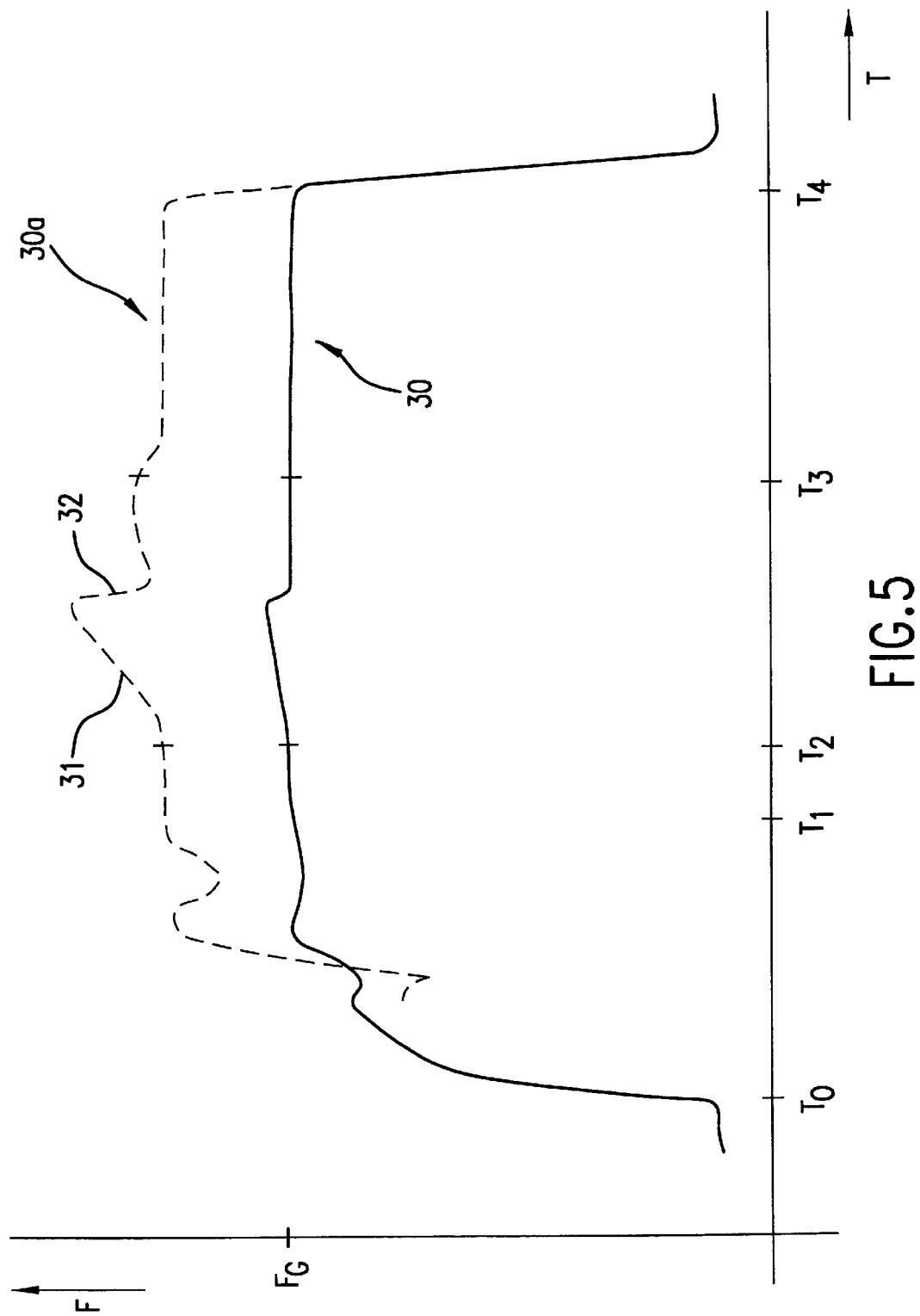

As FIGS. 3–5 show, for an optimum welding spot (FIG. 3) for a cement (FIG. 4) and for spatter (FIG. 5), different and very typical signal curves arise. In these signals electrode force F is plotted as a function of time. At time T0 welding tongs 1 are closed by actuation means 12. Welding force F then rises until time T1 the stipulated or desired base value FG of the electrode force is reached by corresponding control via control means 16 and control valve means 17. Fluctuations of electrode force F in time interval T0–T1 result from rebound processes in the closing of the welding tongs. Relative to time T1, the welding current is turned on at time T2 with some delay controlled by control means 16 and is turned off after a stipulated time period or a period controlled by control means 16 at time T3. Then at time T4, opening of welding tongs 1 by actuating means 12 takes place so that, starting from time T4, electrode force F decreases quickly.

In FIG. 3 curve 26 and curve 26*a*, enlarged by a factor of 4, show the typical behavior of welding current I for an optimum welding spot. The welding current is on in the time interval between T2 and T3. Electrode force F first rises and then drops continuously even before turning off the welding current. Shortly before reaching the end of the welding current or before time T3 28, the behavior of welding current I, in this case with the welding current turned on, has a behavior increasing essentially continuously and decreases continuously and relatively flatly. Increase 27 is thus caused by the thermal expansion of the material and continuous drop 28 is caused by hollow caps 8 sinking somewhat into the liquefied material. This superelevation of electrode force F characterized by rise 27 and continuous drop 28 is typical of a good welding spot.

Control means 16 can therefore conclude by comparing the actually measured electrode force F with an ideal curve that an ideal welding spot has been formed. Preferably, evaluation of the measurement signal of sensors 13 takes place by checking whether this signal fits, for example, into a window stipulated for a good welding spot which also considers allowable tolerances.

Furthermore, control means 16 also considers the area integral under rise 27 and fall 28 and compares it to a stipulated set point. Acquisition of drop 28 at the end of the welding current can be acquired as the typical criterion for a good welding spot.

Curve 29 and curve 29*a*, in turn quadrupled from FIG. 4, shows that for a cement, with the welding current turned on (time interval T2/T3) a minor increase of the electrode force takes place by thermal heating of the material to be welded. However, there is no typical continuous drop at the end of the welding current. FIG. 5 shows the typical behavior of electrode force F for a spatter with curve 30 and with, in turn, quadrupled curve 30*a*. For the duration of the welding current (time interval T2–T3), strong rise 31 takes place and, long before the end of the welding current, an abrupt decrease 32 to roughly value FG occurs. From this strong increase 31, especially, however, from abrupt drop 32, having a slope angle much larger than the slope angle of drop 28, the presence of a spatter can be clearly ascertained.

The invention was described above on one embodiment. It goes without saying that numerous changes and modifications are possible without departing from the inventive idea underlying the invention.

Thus, for example, it is possible for control means 16 to check for a cement by the behavior of the electrode force at the end of each testing phase 22, 22a, etc. and after the current drop has finished due to an overly low welding current I in the first welding spot of the following working phase. In this case, the welding current I is increased by a stipulated amount. Of course, it is also possible to continuously monitor the possible presence of cement at each working phase and that, in the case of a cement, welding current I is increased.

Control means 16, or the program which controls this control means, can furthermore be built for dynamic control of the duration of the welding current. The time interval between T2 and T3 takes place within a certain stipulated framework such that the integral of the rise of the electrode force after turning on the welding current in each case reaches a stipulated minimum value. The welding current is turned off in any case when duration T2–T3 has reached a stipulated maximum value.

In each working phase 20, 20a, 20b, a plurality of welding spots 21 are executed, spatially offset from one another, on the same material to be welded. Of course, it is also possible that the material to be welded is changed during the respective working phase and/or that, in two successive working phases, welding spots 21 are executed spatially offset on the same material to be welded.

Replacement of pole caps 8 is then necessary if, in a testing phase, even after increasing the welding current to a maximum possible boundary value, a spatter is not achieved. In this case on display 33, there is an indication that replacement of the pole caps is necessary.

Reference Number List 1 welding tongs
2, 3 sheet
4, 5 pintle holder
6, 7 pintle
8 pole cap
9, 10 arm
11 joint
12 actuating means
13 sensor
14 fiber optic arrangement
15 measurement means
16 control means
17 control valve means
18 current controller
19 welding channel
20, 20a, 20b working phase
21 welding spot
22, 22a testing phase
23 welding spot
24 spatter limit
25 cement limit
26, 26a behavior of welding current
27 rise
28 fall
29, 29a behavior of welding current
30, 30a behavior of welding current
31 rise
32 drop
33 display

What is claimed is:

1. A process for welding comprising
   providing a welder having tongs for applying an electrical current, an actuator of applying an electrode force and a sensor for measuring the electrode force,
   providing material to be welded in between the tongs,
   conducting a working phase, the working phase comprising a succession of spatially offset welding spots to join the material to be welding,
   conducting a testing phase comprising executing a series of spatially offset welding spots, the welding current increasing by first increments after each welding spot until the spatter limit of the material to be welded is reached,
   decreasing the welding current by a second increment, and
   conducting a second working phase comprising a succession of welding spots.

2. The process for welding of claim 1, wherein all of the welding spots of second working phase are executed with the welding current set by the testing phase.

3. The process for welding of claims 1, further comprising a controller, said controller receiving signals the electrode force sensor and determining the occurrence of a splatter from the electrode force measurements.

4. The process of welding of claim 1, further comprising:
   providing pole caps on the welding tongs,
   setting a maximum welding current, and
   replacing the pole caps when the maximum welding current is reached before a splatter is detected.

5. The process of welding of claim 1, wherein the first increment is 0.2 KA.

6. The process of welding of claim 1, wherein the second increment is 0.4 KA.

7. A method of welding two pieces of material comprising
   placing the two pieces together and in between two welding electrodes,
   performing a working phase at a first current, the working phase comprising a series of spatially offset welding spots,
   performing a test phase, the test phase comprising a series of spatially offset welding spots and increasing the welding current by a set increment after each welding spot, until a splatter occurs, and
   decreasing the welding current by a second set increment and performing a second working phase.

8. The method of welding of claim 7, further comprising setting a maximum welding current for the testing phase, and terminating the welding process when the maximum current is reached before a splatter occurs.

* * * * *